April 13, 1943.  T. A. SCHAEFER  2,316,189
PROTRACTOR
Filed Feb. 16, 1942
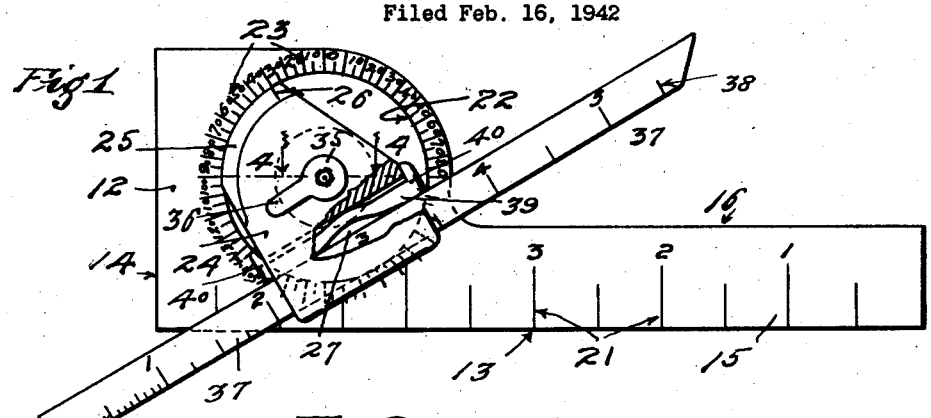
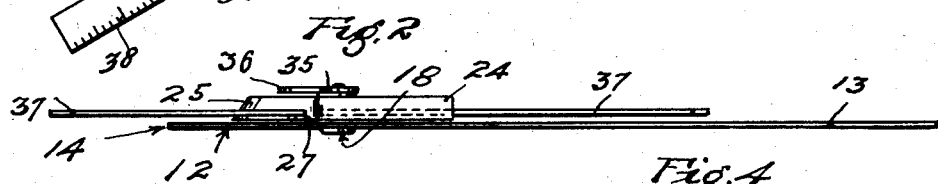
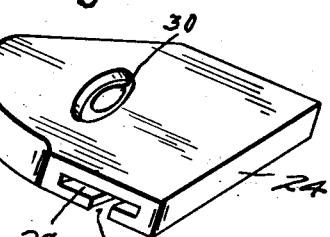
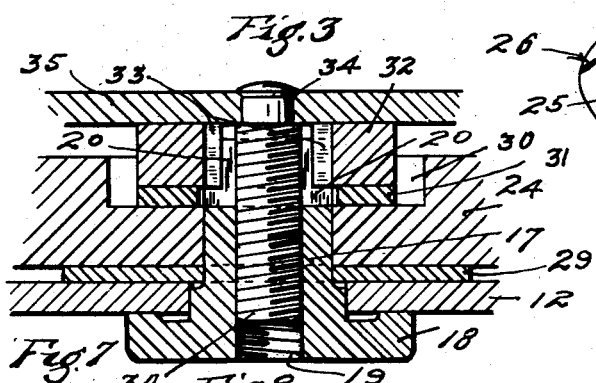
INVENTOR
Timothy A. Schaefer
By his Attorney
Harry D. Kilgore Patented Apr. 13, 1943

2,316,189

UNITED STATES PATENT OFFICE 2,316,189

PROTRACTOR

Timothy A. Schaefer, West Allis, Wis., assignor to Industrial Engineering Co. Inc., Minneapolis, Minn., a corporation of Minnesota Application February 16, 1942, Serial No. 431,018

3 Claims. (Cl. 33—94)

My invention relates to improvements in protractors and, more particularly, to a protractor of the pocket type.

The improved protractor, while intended for general use, is, due to its novel construction and great accuracy, especially well adapted for use by persons engaged in engineering, such as chief engineers, research engineers, tool grinders, machinists, etc., where a quickly accessible protractor is required most of the time.

An object of this invention is to provide a protractor of simple construction, of relatively small cost to manufacture, but at the same time one which measures angles with great accuracy and thus takes the place of a higher priced instrument, and it is also capable of taking certain measurements which are difficult to obtain and cannot now be taken with present instruments.

Another object of the invention is to provide a protractor that is of light weight, thin and having no projecting set-screws or other clamping devices, thus well adapting the protractor to be carried in a pocket.

Still another object of the invention is to provide a protractor for measuring, with greater accuracy than is usually required, angles under all conditions including those difficult to get at and for measuring angles in shallow blind holes and similar instances.

Another object of this invention is to provide a protractor that can also be used as a depth gauge.

Other objects will be apparent from the following description, reference being had to the accompanying drawing.

To the above end, generally stated, the invention consists of the novel devices and combinations of devices hereinafter described and defined in the claims.

In the accompanying drawing, which illustrates the invention, like characters indicate like parts throughout the several views.

Referring to the drawing:

Fig. 1 is a plan view of the improved protractor, a part thereof being broken away and sectioned;

Fig. 2 is a front elevation of the same;

Fig. 3 is a fragmentary detail view principally in section taken on the line 3—3 of Fig. 1, on an enlarged scale;

Figs. 4, 5 and 6 are perspective views, on an enlarged scale, of the body member, pivot member and lock washer removed from the protractor; and Figs. 7 to 11, inclusive, are views of the improved protractor, in diagram on a reduced scale, applied to different objects, certain of which are in section, to illustrate different difficult angles that can be measured to determine the angles thereof in degrees and fractions thereof.

The numeral 12 indicates a base in the form of a thin metal plate having a long supporting straight edge or surface 13 and a short supporting straight edge or surface 14. These two supporting edges 13 and 14 are at right angles to each other and the former is at the left-hand end of said base with reference to Fig. 1. The right-hand end portion of the base 12 is materially reduced in width to afford a relatively long narrow blade 15, the upper edge of which is designated by the numeral 16 and is parallel to the supporting edge 13.

A pivot 17 is mounted on the base 12 between the supporting edge 14 and the inner end of the blade 15 and substantially midway between the supporting edge 13 and the overlying upper edge of said base. This pivot 17 is inserted through a transverse hole in the base 12, from the back thereof and is rigidly secured to said base by a pressed fit or otherwise. A large head 18 on the pivot 17 engages the back of the base 12 and holds said pivot with its longitudinal axis perpendicular to the face of the base 12. The pivot 17 has an axial bore 19, is internally screw-threaded and outwardly of said base is reduced somewhat in diameter. A pair of diametrically opposite keyways 20 are formed in the free or outer end portion of the pivot 17.

The base 12 has a scale 21 of inches and fractions thereof marked on its face, at the supporting edge 13, and reads from the right to the left. A circle 22 having its center at the axis of the pivot 17 is divided into a scale 23 of three hundred sixty degrees (360°) and the zero point in said scale is at the top of the base 12 on a radial line extending from the axis of the pivot 17 parallel to the supporting edge 14. The degrees in the circle 22 are numbered in tens, reading from one (1) to one hundred eighty degrees (180°) in opposite directions from zero. The upper edge portion of the base 12, from zero on the scale 23 to substantially the blade 15, is concentric with said circle.

A body member 24 in the form of a flat metal plate is mounted at its center on the pivot for rotation thereon. This body member 24 has a beveled edge 25 on the arc of a circle that is concentric with the circle 22 and closely engages the degree marks of the scale 25 at their inner ends. A position mark 26 on the beveled edge 25 is provided to indicate where the reading on the scale 23 is to be taken and extends on a radial line from the axis of the pivot 17.

Formed in the body member 24 is a passageway 27 that is diametrically opposite the position mark 26 and extends at right angles to a radial line extending from said mark through the axis of the pivot 17 to the passageway 27. This passageway 27 is rectangular in cross-section and a relatively narrow slot 28 in the back of the head 24 extends into said passageway, see Fig. 4.

A large thin waxed washer 29 on the pivot 17 is interposed between the face of the base 12 and the back of the body member 24. Formed in the top of the body member 24 is an annular depression 30 that surrounds the pivot 17 and is concentric therewith. A relatively thin washer 31, that is loose on the pivot 17, rests on the body member 24 at the bottom of the depression 30. Resting on the washer 31 is a relatively thick washer 32 having a pair of diametrically opposite keys 33 that extend into the keyways 20 and lock the washer 32 to the pivot 17. A screw stud 34 extends into the bore 19 and has threaded engagement with the internal screw threads on the pivot 17, and which pivot acts as a fixed nut for the stud 34. An annular face plate 35, rigidly secured to the screw stud 34 at its outer end, rests on the washer 32 and has a radially projecting fingerpiece 36 by which said stud may be turned in the pivot 17.

Obviously, the base 12 and the face plate 35 afford clamping members which may be actuated by the screw stud 34 and the co-operating nut-acting pivot 17 to frictionally clamp the washer 29, the body member 24, the washer 31 and the washer 32 between said base and face plate.

A long narrow metal arm 37 is mounted in the passageway 27 for endwise sliding movement and for removal from said passageway to be turned end for end and again inserted in the passageway 27. This arm 37 has a scale 38 of inches and frictions thereof marked thereon and one end of said arm is square and the other end thereof is beveled on an angle of forty-five degrees (45°). Obviously, when the position mark 26 is on zero of the scale 23, the arm 37 is parallel to the supporting edge 13 of the base 12. The arm 37 is frictionally held in the body member 24 by a spring member 39 having at its ends outturned ears 40 that engage opposite sides of the body member 24 and thereby hold said member against endwise movement in the passageway 27. The tension of the spring member 39 is sufficient to securely hold the arm 37 against accidental endwise movement wherever positioned in the body member 24.

From the above description, it is evident that the narrow arm 37 makes it possible to take measurements in difficult or restricted places. The thinness of the protractor is very important as it permits the arm 37 to lie close to an object being measured, see Fig. 7. By mounting the arm 37 in the body member 24 for endwise adjustment, it is possible to take measurements, as shown in Figs. 7 to 11, inclusive. The waxed washer 29 maintains the proper friction between the base 12 and the head member 24 and holds the relative position of the head member 24 to the base 12 at which it was set. The purpose of keying the washer 32 to the screw stud 34 is to prevent said washer from turning the face plate 35 when the head member 24 is moved about its axis and thereby turn said stud and change the frictional contact of the members clamped between the base 12 of the face plate 35. It is evident that the screw stud 34 may be adjusted to positively lock the head member 24 from turning, or it can be adjusted so that said head member may be turned but will remain where positioned. By reversing the arm 37 end for end, from its position shown in Fig. 1, the beveled end of said arm may be used when measuring angles, as shown in Figs. 7 to 11, inclusive.

The protractor may be used as a depth gauge by resting the base 12 at either of its supporting edges 13 or 14 on the object being measured and taking the reading on the scale 38 at the respective supporting edge.

When the protractor is not in use, the head member 24 may be adjusted to bring the arm 37 into a position in which it is parallel to the base 12 and said arm endwise adjusted to position its ends at the ends of said base. With the protractor thus adjusted, the same occupies very little space and may be easily carried in a pocket.

During the use of the improved protractor, all adjustments thereof are accomplished without the use of set-screws or other clamping devices. In case it is desirable to positively hold the head member 24 from turning, it is only necessary to move the fingerpiece 36.

From what has been said, it will be understood that the protractor described is capable of modifications as to details of construction and arrangement within the scope of the invention herein disclosed and claimed.

What I claim is:

1. In a protractor, a thin base having a straight edge, an upstanding internally screw-threaded tubular pivot rigidly secured to the base, a flat body member turnably mounted on the pivot, a screw stud in the pivot, a face plate rigidly secured to the screw stud and overlying the body member, said face plate being operable to turn the screw stud in the pivot and said screw in turn move the face plate relative to the base and frictionally clamp the body member therebetween, and a thin narrow arm mounted on the body member for endwise adjustment, said base having a scale of degrees thereon and said body member having a position mark cooperating with said scale.

2. In a protractor, a thin base having two straight edges that extend at right angles the one to the other, an internally screw-threaded pivot rigidly secured to the base, a flat body member turnably mounted on the pivot, a thin washer loose on the pivot between the base and the body member, a thin washer loose on the pivot and resting on the body member, a relatively thick washer on the pivot, resting on the last noted thin washer and said screw in turn held by the pivot against rotation but free for axial movement thereon and extending outwardly of the outer end of the pivot, a screw stud in the pivot, a face plate rigidly secured to the screw stud and resting on said thick washer, said face plate being operable to turn the screw stud in the pivot and move the face plate relative to the base and frictionally clamp the body member and the washers therebetween, and a thin narrow arm mounted on the body member for endwise adjustment, said base having a scale of degrees thereon and said body member having a position mark cooperating with the scale.

3. In a protractor, a thin base having two straight edges that extend at right angles the one to the other, an internally screw-threaded pivot rigidly secured to the base, a flat body member turnably mounted on the pivot, a thin lower washer loose on the pivot between the base and body member, a thin upper washer loose on the pivot and resting on the body member, a relatively thick washer on the pivot, resting on the thin lower washer and extending outwardly of the outer end of the pivot, said pivot having a keyway and said relatively thick washer having a key extending into the keyway and holding said washer against rotation on the screw stud but with freedom for relative axial movement, a screw stud in the pivot, a face plate rigidly secured to the screw stud, resting on said thick washer and having a radially projecting fingerpiece by which said face plate may be rotated to turn the screw stud into the pivot and move the face plate relative to the base and frictionally clamp the body member and washers therebetween, said body member having a transverse passageway eccentric to its axis, a thin narrow arm mounted on the passageway for endwise adjustment, and spring means frictionally holding the arm relative to the body member, said base having a scale of degrees thereon, and said body member having a position mark thereon cooperating with said scale, said mark being diametrically opposite the passageway and on a line perpendicular to the arm and extending through the axis of the pivot.

TIMOTHY A. SCHAEFER.